April 23, 1929.   F. M. WILLIAMSON   1,709,965
NUT LOCK
Filed May 7, 1926

INVENTOR.
FLOYD M. WILLIAMSON
BY
ATTORNEY.

Patented Apr. 23, 1929.

1,709,965

UNITED STATES PATENT OFFICE.

FLOYD M. WILLIAMSON, OF DETROIT, MICHIGAN.

NUT LOCK.

Application filed May 7, 1926. Serial No. 107,342.

This invention relates to nut locks and the object of the invention is to provide a device for preventing the removal of a nut from a bolt or stud.

Another object of the invention is to provide a device of the character described comprising a C shaped ring which may be manufactured very cheaply and which may be secured to or removed from a bolt very readily.

A further object of the invention is to provide a ring member for replacing the ordinary cotter pin and which is not provided with extending points or ends to catch in the clothing.

A further object of the invention is to provide a nut lock in which the usual castellated nut and apertured bolt is utilized so that the construction of the nut and bolt for use with a cotter pin need not be changed, to allow use of my device.

These objects and the several novel features of the invention are hereinafter more fully described and claimed and the preferred form of construction by which these objects are attained is shown in the accompanying drawings in which—

Figure 1:
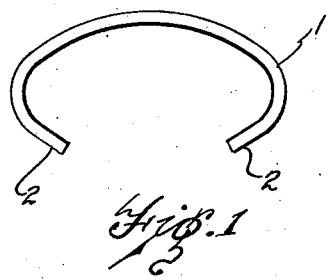
Fig. 1 is an elevation of a cotter ring embodying my invention.
Figure 2:
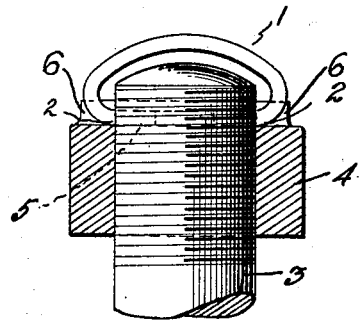
Fig. 2 is a section through a nut and bolt showing my cotter ring as utilized therewith.
Figure 3:
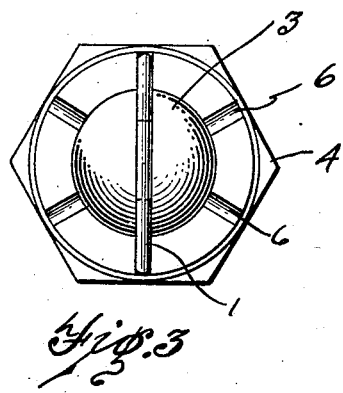
Fig. 3 is a plan view of the cotter ring as utilized with the nut and bolt.
Figure 4:
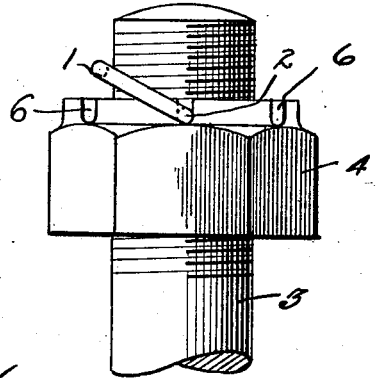
Fig. 4 illustrates the method of applying the cotter ring when the bolt extends through the nut to a considerable extent.

As shown in Fig. 1 the device comprises a C shaped ring 1 having ends 2 which are straight. The bolt 3 is threaded to receive the castellated nut 4 and is provided with a transverse aperture 5 therethrough with which the radial notches 6 in the outer face of the nut are adapted to align. When the notches 6 are in alignment with the aperture 5 the ends 2 of the ring are inserted in the aperture 5 and by means of a pair of pliers the ring is compressed to force the ends 2 of the ring together in the aperture 5. The ends 2 of the ring are made straight so as to readily align end to end in the aperture 5. When the ring is secured in the bolt as shown in Fig. 2, the portions of the ring engaging in the notches 6 prevent the nut from turning on the bolt and thus the ring forms an effective lock. When the bolt extends through the nut to a considerable extent, as shown in Fig. 4, the arcuate portion 1 of the ring is positioned at one side of the bolt while the ends 2 extend through the notches 6 in the nut and into the aperture 5 in the bolt. To remove the ring from the bolt it is only necessary to slip a screw driver or other implement between the bolt and ring and by applying a slight pressure the ring may be easily withdrawn from the bolt and is thus much more easily removed than the usual cotter pin in which the ends extending through the bolt are bent outwardly to secure the cotter pin in place. With this device there are no extending ends to catch in the clothing and waste may be utilized around this device without being caught.

From the foregoing description it becomes evident that the device is very simple and efficient in operation, is of very cheap construction, may be more easily secured to or removed from a bolt than the usual cotter pin and provides a device which accomplishes the objects described.

Having thus fully described my invention, its utility and mode of operation, what I claim and desire to secure by Letters Patent of the United States is—

In a nut lock, a cotter ring adapted for use in retaining a castellated nut on a bolt having an aperture for alignment with the oppositely disposed radial notches of the nut comprising a substantially C shaped member having end portions extending outwardly at a tangent to curved portions of which they form the terminals, the said end portions being normally spaced apart a distance at least equal to the threaded aperture of the nut, said member being formed of a material permitting the end portions to be permanently deflected by pressure applied to the ring opposite the space between said ends when the same are respectively lying in the oppositely disposed notches of the nut and thereby causing said ends to enter opposite ends of the bolt aperture.

In testimony whereof I sign this specification.

FLOYD M. WILLIAMSON.